July 29, 1952 G. D. PERKINS 2,605,407
BLOCKING OSCILLATOR
Filed Jan. 5, 1946
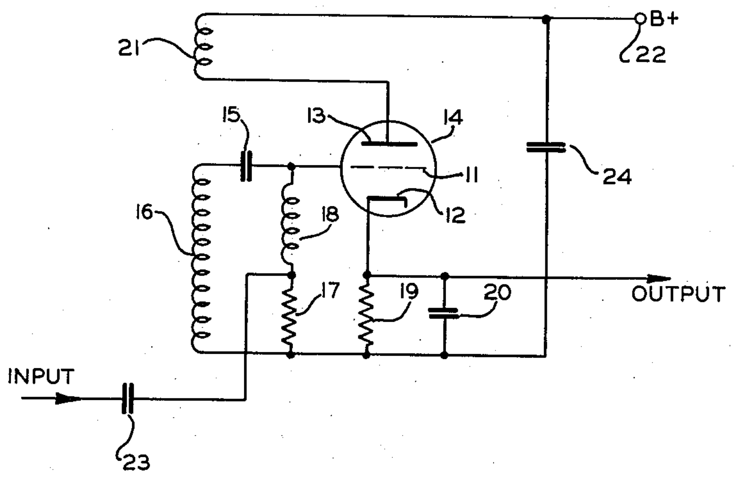
INVENTOR
GEORGE D. PERKINS
BY M. C. Hayes
ATTORNEY Patented July 29, 1952 2,605,407

UNITED STATES PATENT OFFICE 2,605,407

BLOCKING OSCILLATOR

George D. Perkins, Allston, Mass., assignor, by mesne assignments, to the United States of America as represented by the Secretary of the Navy Application January 5, 1946, Serial No. 639,283

6 Claims. (Cl. 250—27)

This invention relates to an electronic oscillator and more particularly to a novel blocking oscillator incorporating a comparatively high frequency resonant tank circuit and utilizing cathode bias.

Heretofore, blocking oscillators were limited in application because the "dead time" during which the oscillator remained inoperative, was relatively long. Furthermore, conventional type blocking oscillators generally required iron core transformers and external bias supplies.

A primary object of the present invention is to generally improve blocking oscillators by eliminating the foregoing difficulties.

Another object of the present invention is to provide a blocking oscillator that can either be triggered or free running and utilizes a high frequency resonant circuit therein.

A further object is to provide a blocking oscillator which requires no external source of power for biasing.

These and other objects will be apparent from the following specification when taken with the accompanying drawing which is a circuit diagram of an embodiment of the invention.

Referring to the drawing there is illustrated an electron tube (triode) blocking oscillator 14. A cathode biasing resistor 19 shunted by capacitor 20 is connected to the cathode 12 of electron tube 14. The latter are of such values as to place when in operation, a rather high bias on the cathode and thereby normally prevent constant oscillation of the electron tube. An LCR network (tank circuit), composed of resistor 17, inductor 18, capacitor 15 and inductor 16 is connected in the circuit with the grid 11 of the electron tube 14. Anode 13 of the electron tube 14 is connected to a positive power supply 22 through an inductor 21 which is inductively coupled to the inductor 16 in such a manner as to tend to make the electron tube 14 oscillate. Constant oscillation as previously mentioned is prevented by the rather high cathode bias. Capacitor 24 is a radio frequency return from the anode to the cathode.

When a positive input trigger is applied through coupling capacitor 23 to the grid LCR network at the junction of resistor 17 and inductor 18, this trigger overcomes the bias on the tube 14 and the circuit oscillates strongly, thereby causing the current through the cathode resistor 19 to increase rapidly and again raise the bias to the point where oscillations can no longer be sustained. The cathode voltage rise during this time is extremely sharp, thereby producing the output pulse. The charge stored on the cathode capacitor 20 discharges exponentially when oscillation ceases, and the circuit quickly returns to a quiescent state ready for the next input trigger. The rise time of the output pulse is dependent on the oscillation frequency, which in turn is determined by the circuit constants. The period of one cycle at the frequency of oscillation of the grid tank circuit is preferably considerably shorter than the period of the desired output pulse. As the oscillation frequency is increased the rise time decreases, and the required value of cathode capacitor 20 is decreased. For a tank circuit frequency of about 200 megacycles, no cathode capacitor is required. Likewise, the decay time decreases with an increase in frequency, and becomes very short for the higher frequencies. Thus the dead time of this type of blocking oscillator will be very short when high frequencies are employed. As is further evident from the drawing, there is no need for an iron core transformer or an external bias supply. By adjustment of the bias, the oscillator may be made free running or triggered.

The invention described in the foregoing specification need not be limited to the details shown, which are considered to be illustrative of one form the invention may take. What is desired to secure by Letters Patent and claim is:

1. A blocking oscillator for providing an output pulse when triggered by an input trigger comprising, an electron tube having an anode, a cathode and a control grid, a resonant tank circuit connected between said grid and a point of reference potential, said resonant tank circuit having a period short compared to the duration of said output pulse, an inductor inductively coupled to said tank circuit, said inductor being connected between said anode and a source of positive potential, resistive means connecting said cathode to a said point of fixed reference potential, said resistive means having an impedance such that said electron tube is normally biased to a non-oscillatory state, coupling means associated with said tank circuit providing means for introducing said trigger to said tank circuit and means for deriving an output signal from across said resistive means.

2. A blocking oscillator for providing an output pulse when triggered by an input trigger comprising an electron tube having an anode, a cathode and a grid, a resonant tank circuit connecting said grid to a point of reference potential, an inductor coupling said anode to a point of positive potential, said inductor being regeneratively coupled to said tank circuit, a resistor connecting said cathode to said point of reference potential, said resistor having a value such that said circuit is normally biased to a non-oscillatory state, coupling means associated with said tank circuit providing means for introducing said trigger to said tank circuit, whereby said circuit upon introduction of a trigger causes the anode current in said electron tube to increase until limited by the voltage drop across said resistor, and means for obtaining an output signal from across said resistor.

3. A blocking oscillator for providing an output pulse when triggered by an input trigger comprising an electron tube having an anode, a cathode and a control grid, a resonant tank circuit connecting said grid to a point of reference potential, the period of the resonant frequency of said tank circuit being short compared to the time duration of said output pulse, an inductor connected between said anode and point of positive potential, said inductor being regeneratively coupled to said tank circuit, a resistive means connecting said cathode to said point of reference potential said resistive means having an impedance such that said circuit is normally biased to a non-oscillatory state, coupling means associated with said tank circuit and providing means for coupling a trigger to said tank circuit, whereby said circuit upon introduction of a trigger causes the anode current in said electron tube to increase sharply until limited by the biasing action of said resistive means, and means for coupling an output signal from said cathode.

4. A blocking oscillator as in claim 3 said oscillator further comprising a first capacitor connected in shunt with said resistive means and a second capacitor connecting said point of positive potential to said point of reference potential.

5. A blocking oscillator for providing an output pulse comprising an electron tube having an anode, a cathode and a control grid, a resonant tank circuit connecting said grid to a point of reference potential, the period of the resonant frequency of said tank circuit being short compared to the time duration of said output pulse, an inductor connected between said anode and a point of positive potential, said inductor being regeneratively coupled to said tank circuit, high frequency by-pass means connecting said point of positive potential to said point of reference potential, bias means connecting said cathode to said point of reference potential said bias means comprising of a capacitor in shunt with a resistor, said bias means having an impedance such that said electron tube is biased to a non-oscillatory state by the first pulse of anode current through said tube, whereby said circuit upon initiation of oscillation in said tank circuit causes the anode current to increase sharply until limited by the increase in potential across said bias means, and means for coupling an output signal from said cathode.

6. A blocking oscillator for providing an output pulse comprising an electron tube having an anode, a cathode and a control grid, a parallel resistor-capacitor combination connected at one terminal thereof to said cathode, a second terminal of said combination serving as a point of reference, said resistor-capacitor combination having an impedance such that said electron tube is normally biased to a non-oscillatory state, a first inductor having one terminal thereof coupled to said grid and a second terminal thereof connected to said point of reference through a second resistance, a second inductor having a first terminal thereof coupled to said grid through a second capacitor and a second terminal thereof connected to said point of reference, said first and second inductors, said second resistor and said second capacitor forming a tuned circuit having a period short compared to the duration of the output pulse from said oscillator, a third inductor coupled between said anode and a source of positive potential, said third inductor being inductively coupled to said second inductor, and means for coupling an input signal across said second resistor thereby to initiate anode current flow in said electron tube.

GEORGE D. PERKINS.

REFERENCES CITED

The following references are of record in the file of this patent:

UNITED STATES PATENTS

| Number | Name | Date |
|---|---|---|
| 2,212,202 | Faudell et al. | Aug. 20, 1940 |
| 2,254,087 | Percival | Aug. 26, 1941 |
| 2,257,663 | Albrecht | Sept. 30, 1941 |
| 2,266,668 | Tubbs | Dec. 16, 1941 |
| 2,297,742 | Campbell | Oct. 6, 1942 |
| 2,355,606 | Shannon | Aug. 16, 1944 |
| 2,493,517 | Applegarth | Jan. 3, 1950 |